(12) United States Patent
Chitren et al.

(10) Patent No.: US 7,427,070 B2
(45) Date of Patent: *Sep. 23, 2008

(54) UNITIZING ELEMENT AND METHOD FOR ASSEMBLING A SEAL

(75) Inventors: Elizabeth Chitren, Fairport, NY (US); Christopher Tones, Palmyra, NY (US)

(73) Assignee: Garlock Sealing Technologies LLC, Palmyra, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/709,818

(22) Filed: Feb. 23, 2007

(65) Prior Publication Data

US 2007/0145690 A1    Jun. 28, 2007

Related U.S. Application Data (60) Continuation of application No. 11/297,489, filed on Dec. 9, 2005, now Pat. No. 7,201,377, which is a division of application No. 10/674,264, filed on Sep. 29, 2003, now abandoned.

(60) Provisional application No. 60/414,862, filed on Sep. 30, 2002.

(51) Int. Cl.
F16J 15/44       (2006.01)
F16J 15/447      (2006.01)

(52) U.S. Cl. .................. 277/347; 277/411; 277/412

(58) Field of Classification Search ............... 277/409, 277/411–414, 347, 928
See application file for complete search history.

(56) References Cited

U.S. PATENT DOCUMENTS

| | | | |
|---|---|---|---|
| 2,014,859 A | 9/1935 | Mitchell | 308/187 |
| 3,192,942 A | 7/1965 | Manor et al. | 137/246.19 |
| 3,602,559 A | 8/1971 | Hirschler | 384/478 |
| 3,923,125 A | 12/1975 | Rosenthal | 184/6 |
| 4,166,606 A | 9/1979 | Kawolics et al. | 251/214 |
| 4,466,620 A | 8/1984 | Orlowski | 277/412 |
| 4,484,754 A | 11/1984 | Ballard | 277/416 |
| 4,541,744 A | 9/1985 | Lederman | 384/607 |
| 4,679,801 A | 7/1987 | Poloni | 277/349 |
| 4,706,968 A | 11/1987 | Orlowski | 277/347 |
| 4,743,034 A | 5/1988 | Kakabaker et al. | 277/420 |
| 4,832,350 A | 5/1989 | Orlowski | 277/421 |
| 4,852,890 A | 8/1989 | Borowski | 277/425 |
| 4,890,941 A | 1/1990 | Calafell, II et al. | 277/347 |
| 4,989,883 A | 2/1991 | Orlowski | 277/303 |

(Continued)

FOREIGN PATENT DOCUMENTS

DE    297 15 911    2/1999

*Primary Examiner*—Vishal Patel
(74) *Attorney, Agent, or Firm*—Holland & Hart LLP (57) ABSTRACT

An annular unitizing element has a rotor engaging member, a stator engaging member, and a rear member. The radially outer surface of the unitizing element has two areas of differing diameter, one corresponding to the rotor engaging member and the other corresponding to the rear member. The stator engaging member extends radially inward from the radially inner side of the annular unitizing element. A sealing assembly for sealing a rotating shaft and a bearing housing has a rotor having an annular engagement flange extending in an axial direction comprising a groove on a radial side thereof, a stator having an annular engagement flange extending in an axial direction comprising a groove on a radial side thereof, and an annular unitizing element having a stator engaging member, a rotor engaging member, and a rear member.

11 Claims, 7 Drawing Sheets

U.S. PATENT DOCUMENTS

| | | | |
|---|---|---|---|
| 5,024,451 A | 6/1991 | Borowski | 277/412 |
| 5,069,461 A | 12/1991 | Orlowski | 277/303 |
| 5,074,567 A | 12/1991 | Orlowski | 277/347 |
| 5,078,410 A | 1/1992 | Warman et al. | 277/433 |
| 5,158,304 A | 10/1992 | Orlowski | 277/421 |
| 5,161,804 A | 11/1992 | Orlowski et al. | 277/378 |
| 5,174,583 A | 12/1992 | Orlowski et al. | 277/421 |
| 5,221,095 A | 6/1993 | Orlowski | 277/303 |
| 5,335,921 A | 8/1994 | Orlowski | 277/637 |
| 5,378,000 A | 1/1995 | Orlowski | 277/311 |
| 5,470,157 A | 11/1995 | Dougherty et al. | 384/448 |
| 5,480,161 A | 1/1996 | Borowski | 277/419 |
| 5,498,006 A | 3/1996 | Orlowski | 277/419 |
| 5,655,781 A | 8/1997 | Petrak | 277/371 |
| 5,687,972 A | 11/1997 | Petrak | 277/349 |
| 5,865,441 A | 2/1999 | Orlowski | 277/364 |
| 5,887,875 A | 3/1999 | Salciccioli et al. | 277/402 |
| 5,904,356 A | 5/1999 | Mundy | 277/431 |
| 5,908,195 A | 6/1999 | Sharrer | 277/412 |
| 5,951,020 A | 9/1999 | Orlowski | 277/419 |
| 5,951,033 A * | 9/1999 | Winter et al. | 280/276 |
| 5,967,524 A | 10/1999 | Federovich | 277/351 |
| 6,003,871 A | 12/1999 | Poll | 277/309 |
| 6,015,153 A | 1/2000 | Sharrer | 277/412 |
| 6,062,568 A | 5/2000 | Orlowski et al. | 277/348 |
| 6,182,972 B1 | 2/2001 | Orlowski | 277/350 |
| 6,213,476 B1 | 4/2001 | Chandler et al. | 277/569 |
| 6,234,489 B1 | 5/2001 | Orlowski et al. | 277/395 |
| 6,257,587 B1 | 7/2001 | Toth et al. | 277/309 |
| 6,311,984 B1 | 11/2001 | Orlowski | 277/418 |
| 6,367,807 B1 | 4/2002 | Rockwood | 277/412 |
| 6,390,477 B1 | 5/2002 | Drago et al. | 277/358 |
| 6,419,233 B2 | 7/2002 | Orlowski | 277/411 |
| 6,471,211 B1 | 10/2002 | Garnett et al. | 277/351 |
| 6,471,215 B1 | 10/2002 | Drago et al. | 277/412 |
| 6,485,022 B1 | 11/2002 | Fedorovich | 277/303 |
| 2001/0002742 A1 | 6/2001 | Orlowski | 277/361 |
| 2002/0167131 A1 | 11/2002 | Orlowski et al. | 277/371 |

* cited by examiner

UNITIZING ELEMENT AND METHOD FOR ASSEMBLING A SEAL

CROSS-REFERENCE TO RELATED APPLICATIONS

This application is a continuation of and claims priority to U.S. patent application Ser. No. 11/297,489, filed Dec. 9, 2005 now U.S. Pat. No. 7,201,377, which is a divisional of and claims priority to U.S. patent application Ser. No. 10/674,264, filed Sep. 29, 2003 now abandoned, which claims priority to U.S. Provisional Application No. 60/414,862, filed Sep. 30, 2002, entitled "LABYRINTH SEAL", all of which are herein incorporated by reference in their entirety.

FIELD OF THE INVENTION

The present invention relates to labyrinth sealing devices for providing a dynamic seal between a rotating shaft and a bearing housing, and a method for assembling the same.

DESCRIPTION OF RELATED ART

Labyrinth type rotary shaft seals are well known in the art. Typically, these devices include two concentric ring structures which comprise a rotor and a stator. The rotor is sealingly engaged with a rotating shaft and the stator is sealingly engaged with a bearing housing. Many different types of seals have been used to try to seal the space between the spinning rotor and the fixed stator. These include O-rings, rubber lip seals, and labyrinth seals. Labyrinth seals are the most effective type of seal. Specifically contoured pathways or grooves are formed on the interior surfaces of the seal rings to create a labyrinth extending between the exterior of the bearing housing and the interior of the bearing housing. The labyrinth pathway serves as a hydrodynamic barrier to maintain fluid lubricants within the bearing housing and prevent contaminants from entering the bearing housing. The more elaborate the pathway, the less chance there is that contaminating materials will pass through the structure and into the bearing housing.

One method of making a more elaborate pathway is to increase the amount of surface area that must be traversed by the contaminating materials, i.e. by increasing the length of the pathway. In order to achieve an effective labyrinth seal, many have created elaborate sealing structures comprising ridges and valleys on both the rotor and stator sides which interlock to form a seal. By increasing the number of ridges and valleys, the total surface area/length of pathway is increased thereby achieving the above stated goal of blocking out contaminants. Given the relatively small spaces and tolerances involved, the number and size of these fingers is limited.

In another aspect of rotary shaft seals, contaminants which do migrate into the system need to be expelled as quickly as possible. Build up of particulate matter can damage the seal and/or cause increased wear of the rotor and stator. Furthermore, any lubricating fluid forced out of the system must likewise be recaptured and returned to the interior of the rotor. Loss of lubricating fluid will lead to damaged parts and increase the frictional heat of the system.

In a typical rotor and stator configuration, some minimum clearance must be maintained to keep the rotor and stator from contacting one another. In some applications, such as aircraft landing gear, the rotor spins at speeds in excess of about 5000 rpm. If a surface of the rotor contacts a surface of the stator at these speeds, frictional heat develops, the components wear and the overall efficiency and working life of the apparatus declines. It is, therefore, important to keep the rotor and stator separate.

Rubber or plastic sealing devices are often employed between the rotor and stator to keep them separate in the radial direction by providing a low friction contact between the two components. It would also be beneficial if the same sealing device could prevent contact in the axial direction, in the event that the rotor was forced toward the stator.

If the rotor were to move away from the stator, the reverse problem can occur. As the rotor moves axially away from the stator, the gap between the components widens, increasing the likelihood of contaminants entering the bearing housing or grease leaking to the outside. Both of these being undesirable scenarios, a seal that "unitizes" the rotor and stator effectively locking them together is desired. The seal should provide for easy assembly of the components, but withstand and prevent the rotor from disengaging the stator in the axial direction.

Prior labyrinth seals have failed to provide an effective seal that is durable and wear-resistant, unitizes the rotor and stator, and prevents contact between the rotor and stator during periods of axial movement.

It is to these perceived needs that the present invention is directed.

BRIEF SUMMARY OF THE INVENTION

The present invention provides a unitizing element and assembly for a labyrinth seal which provide a dynamic seal between a rotating shaft and a bearing housing. The unitizing element excludes contaminants from the bearing housing, while also preventing loss of bearing lubricants. The unitized, non-contacting configuration also prevents wear of the rotor and stator in the case of axial movement.

In a first aspect of the present invention, an annular unitizing element is provided comprising a rotor engaging member, a stator engaging member, and a rear member. The radially outer surface of the unitizing element comprises two areas of differing diameter, one corresponding to the rotor engaging member and the other corresponding to the rear member and the stator engaging member extends radially inward from the radially inner side of the annular unitizing element.

In another aspect of the present invention a sealing assembly for sealing a rotating shaft and a bearing housing is provided comprising a rotor comprising an annular engagement flange extending in an axial direction comprising a groove on a radial side thereof, a stator comprising an annular engagement flange extending in an axial direction comprising a groove on a radial side thereof, and an annular unitizing element comprising, a stator engaging member, a rotor engaging member, and a rear member. The rotor engaging member engages the rotor groove and the stator engaging member extends from the unitizing element in a radial direction to engage the stator groove.

In a further aspect of the present invention a method for assembling a sealing assembly for sealing a rotating shaft and a bearing housing is provided comprising: providing a rotor comprising an annular engagement flange extending in an axial direction comprising a groove on a radial side thereof, providing a unitizing element comprising a stator engaging member, a rotor engaging member, a void comprising the area between the stator engaging member and the rotor engaging member, and a rear member; engaging the unitizing element with the rotor such that the rotor engaging member of the unitizing element is retained within the groove on the rotor annul engagement flange; further providing a stator comprising an annular engagement flange extending in an axial direction comprising a groove on a radial side thereof; and finally engaging the rotor and unitizing element with the stator such that the stator engaging member deflects onto the void until the unitizing element is in position, then the stator engaging member extends into the area of the stator groove.

A feature of the present invention is the new design of a uniquely shaped unitizing element. The unitizing element is annular with a cross section that is substantially rectangular to fit within the confines of grooves in the rotor and stator. The unitizing element further comprises a stator engaging member to lockingly engage a groove on the stator and a rear member that extends to contact the rear wall of the stator to prevent axial movement. If axial movement shifts the rotor toward the stator, the unitizing element will make contact before any wear of the rotor and stator can occur. The rear member on this ring is precisely designed to contact the back wall of the stator before the rotor contacts the stator. This feature will prevent any wear of the main components and preserve the labyrinth pathway.

As will be realized by those of skill in the art, many different embodiments of a labyrinth unitizing element and method of assembly according to the present invention are possible. Additional uses, objects, advantages, and novel features of the invention are set forth in the detailed description that follows and will become more apparent to those skilled in the art upon examination of the following or by practice of the invention.

DETAILED DESCRIPTION OF THE INVENTION

The present invention comprises a novel unitizing element for use between a rotating shaft and a bearing housing comprising a stator. This unitizing element is an annular ring shaped to fit the grooves formed in the rotor and stator. This unitizing element unitizes the rotor and stator, preventing separation and restricting movement. This unitizing element also contains a rear member which, in the case of axial movement, will provide a non-metallic component to prevent contact of the rotor and stator.

In another aspect of the present invention, a labyrinth sealing assembly is provided. The labyrinth sealing assembly comprises a stator engaging a bearing housing, and a rotor engaging a rotating shaft. A labyrinth pathway is defined between the two components to prevent the migration of lubricants and/or contaminants in either direction. The stator comprises an axially extending flange with a groove. This groove mates with a similar groove on the rotor. Contained within the resulting cavity is the annular unitizing element.

In another embodiment of the present invention, a method for assembling a sealing assembly is provided. A unitizing element is employed between a rotating shaft and a bearing housing to prevent leakage of lubricant from the housing and entry of contaminants into the housing. Further, the unitizing element unitizes the sealing assembly and prevents contact of the rotor and stator.

The invention will now be further described by way of specific embodiments thereof, with the understanding that the present disclosure is to be considered as an exemplification of the principles of the invention. Exemplary embodiments of the present invention are shown in the figures where like numerals refer to like aspects of the various embodiments.

Figure 1:
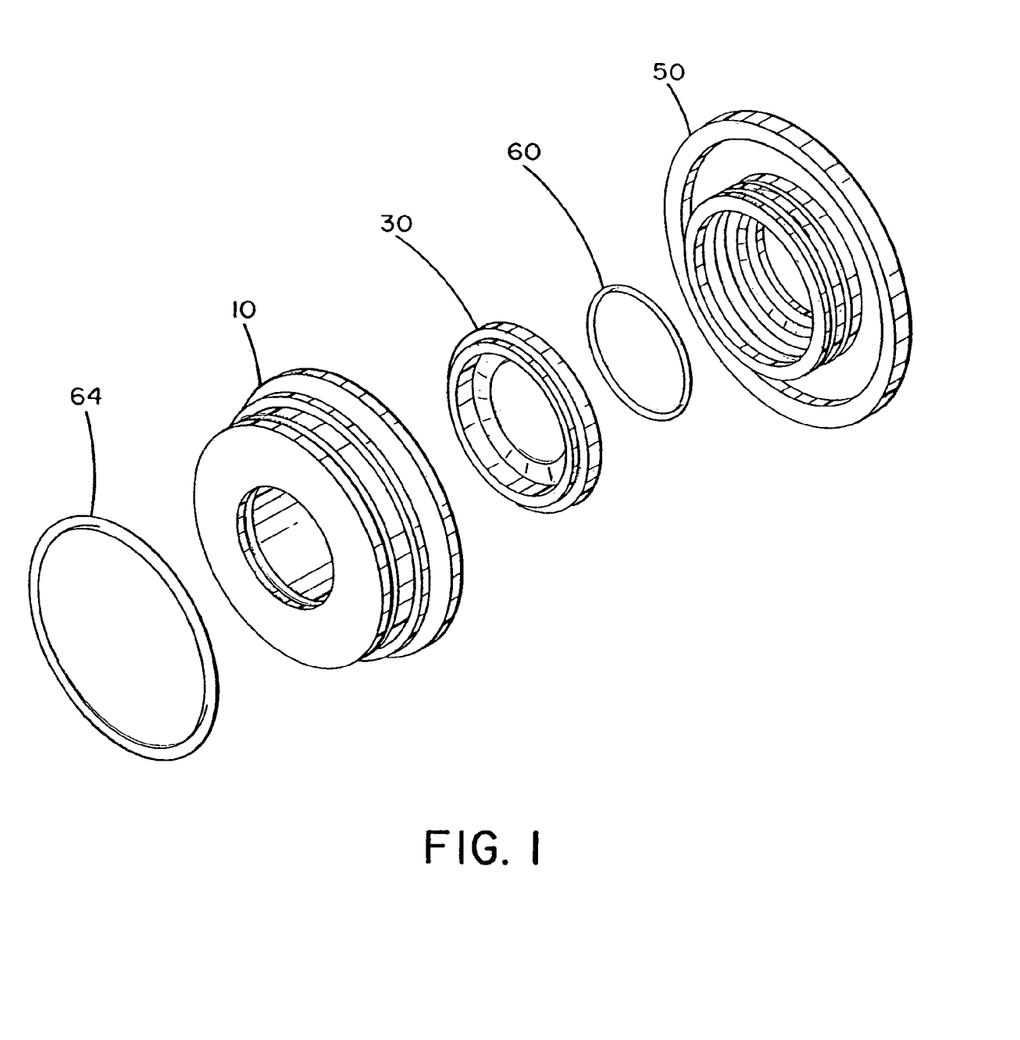
FIG. 1 is an isometric exploded view of a sealing assembly in an embodiment of the present invention.

Referring to FIG. 1, the unitizing element of the present invention shown in a sealing assembly which generally comprises a stator 10 sealingly engaged to the bearing housing by an O-ring 64, a rotor 50 which is sealingly engaged to the shaft by an O-ring 60, and a unitizing element 30 located between the rotor 50 and the stator 10. As the rotor turns, the unitizing element 30 prevents the rotor from contacting the stator by providing a low friction buffer between the two components and further retains lubrication within and excludes contaminants from the bearing housing.

Figure 2:
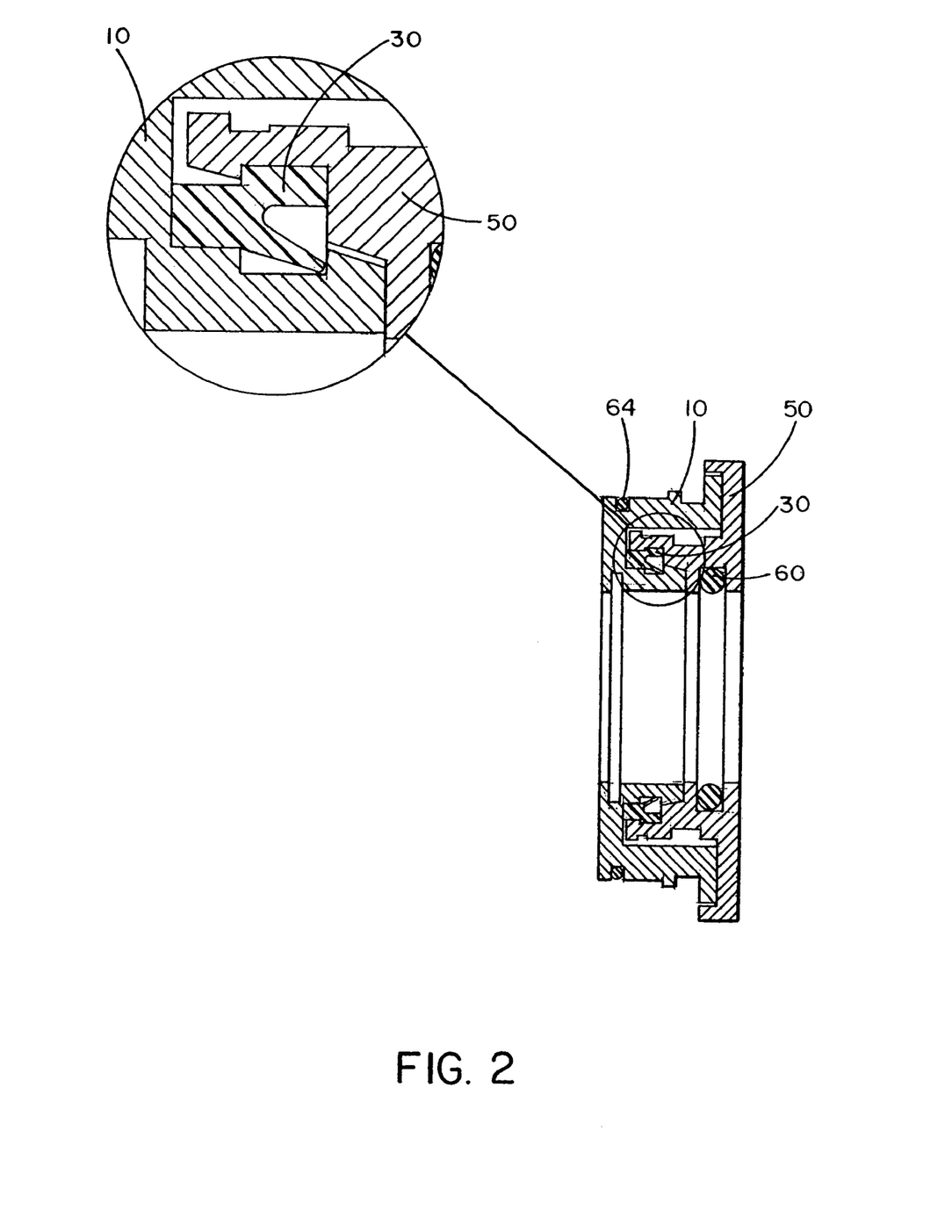
FIG. 2 is a cross sectional view of an embodiment of the present invention comprising a cross section of the sealing assembly including an enlarged view of the unitizing element and surrounding area.
Figure 4:
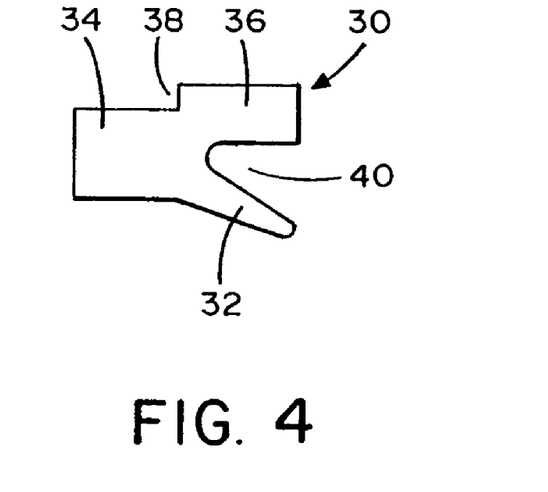
FIG. 4 is a cross sectional view of a unitizing element of an embodiment of the present invention.

The unitizing element may be viewed in more detail in FIGS. 2 and 4, which show a cut away view of the assembly, and a cross sectional view of the unitizing element, respectively. Viewing a cross section, the unitizing element comprises a rotor engaging member 36, a rear member 34 and an stator engaging member 32.

In one embodiment of the present invention, the radially outer surface of the unitizing element comprises two areas of differing diameter. The differing diameters include, one diameter in the area of the rear member 34 and a differing diameter in the area of the rotor engaging member 36. A wall 38 is formed by the disparity in diameter between the rear member 34 and the rotor engaging member 36. This wall 38 functions to retain the unitizing element within a rotor 50 during assembly, and to unitize the rotor 50 and stator 10 after assembly. In a preferred embodiment of the present invention, the wall 38 is positioned at about the axial midpoint of the unitizing element. However, one skilled in the art will recognize the position of the wall 38 will vary depending on the functionality required of the unitizing element and the configuration of the rotor and stator assembly. In a preferred embodiment of the present invention, the wall 38 is substantially perpendicular to the axis of rotation.

The stator engaging member 32 extends from the radially inner side of the unitizing element 30. The stator engaging member 32 extends from about the midpoint of the unitizing element at an angle. The length and exact location of the stator engaging member will depend upon rotor and stator characteristics as well as ease of assembly concerns. The stator engaging member must have sufficient strength to unitize the sealing assembly, while being flexible enough to deflect during assembly. There is a void 40 formed by the area between the rotor engaging member 36 and the stator engaging member 32. This void 40 provides an area for the stator engaging member 32 to deflect into when the rotor, stator, and unitizing element are brought together into a sealing assembly.

While the particular shape of the unitizing element 30 including the wall 38, rear member 34, rotor engaging member 36 and stator engaging member 32 are critical to its operation, the exact dimensions of these components as well as that of the unitizing element itself will vary according to the intended use of the unitizing element. These modifications in dimension will be apparent to one skilled in the art and fall within the scope of this invention. Thus, the unitizing element of the present invention is not limited to sealing applications of any particular size, and is equally applicable to a wide range of uses.

The unitizing element 30 of the present invention comprises a material suitable for its intended purpose depending on the particular temperature, pressure, coefficient of friction, and other operating characteristics. Common materials for use in the unitizing element of the present invention comprise fluorinated polymers or resins. In one embodiment of the present invention, the unitizing element 30 comprises a lubricious plastic material. In a preferred embodiment of the present invention, the unitizing element comprises polytetrafluoroethylene (PTFE).

In a most preferred embodiment of the present invention, the unitizing element 30 comprises filled PTFE. Filled PTFE comprises PTFE with a filler dispersed throughout. Fillers include, but are not limited to, structural fillers such as glass, and lubricants such as graphite, molybdenum disulphide, and other solid lubricants.

In another aspect of the present invention, a sealing assembly is provided comprising the unitizing element 30 of the present invention. An example of a sealing assembly of the present invention may be best viewed in FIGS. 1 and 2. The sealing assembly comprises a rotor 50, stator 10, and unitizing element 30. The rotor 50 is sealingly engaged to a shaft running through the center of the sealing assembly. The rotor 50 comprises an axially extending annular flange 52 comprising a rotor groove 54 located on a radially inward side of the flange 52. The stator 10 is sealingly engaged to a bearing housing 68 and comprises an axially extending annular flange 12 comprising a stator groove 14 located on a radially outward side of the flange 12. A unitizing element 30 comprising an rotor engaging member 36, an stator engaging member 32, and a rear member 34 resides within the area formed by the space between the rotor annular flange 52 and the stator annular flange 12. More precisely, the unitizing element 30 resides partially within each of the rotor groove 54 and stator grove 14 with the rear member 34 extending toward the stator rear wall 20.

Figure 3:
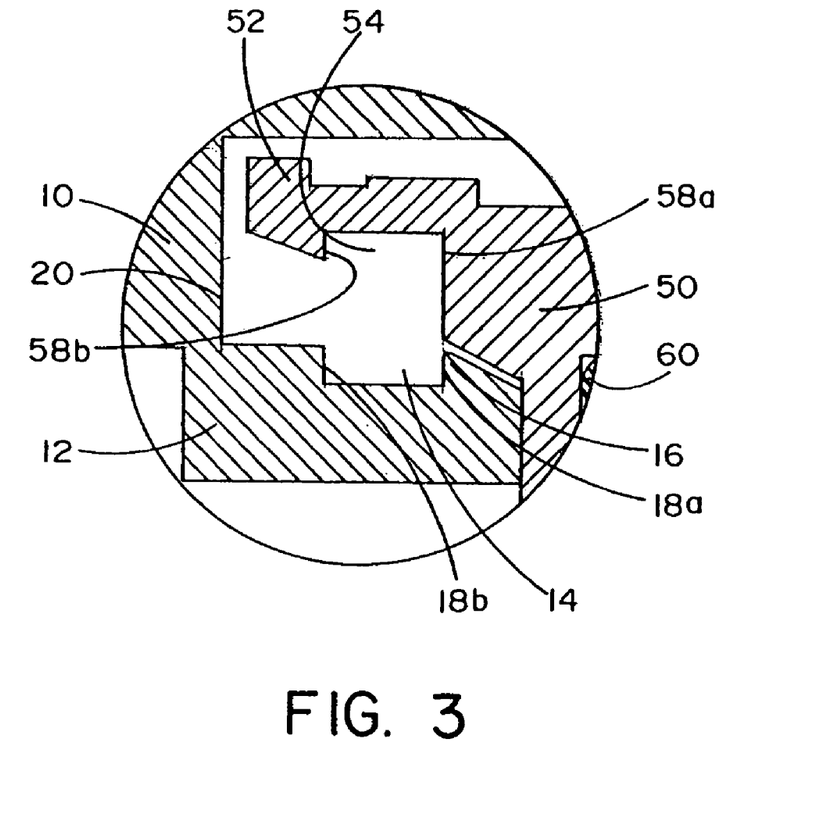
FIG. 3 is a cross sectional view of a rotor and stator configuration without the unitizing element in an embodiment of the present invention.

FIG. 3 shows the detailed portion of FIG. 2 without the unitizing element in place. In one embodiment of the present invention, the sealing assembly includes a rotor 50, which is sealingly engaged to the shaft by an O-ring 60. The rotor includes an annular flange 52, which contains a groove 54 located on a radially inward side thereof. The groove 54 comprises two opposing walls 58a and 58b. Similarly, the stator 10 comprises an annular flange 12 containing a groove 14. The stator groove 14 also comprises two opposing walls 18a and 18b. In a preferred embodiment of the present invention, the opposing walls of the rotor groove 58a, 58b and the opposing walls of the stator groove 18a, 18b are about perpendicular to the axis of the shaft.

In one embodiment of the present invention, shown in FIG. 3, each opposing wall of the rotor groove is axially aligned with the corresponding opposing wall of the stator groove, such that opposing wall 58a is axially aligned with opposing wall 18a and opposing wall 58b is axially aligned with opposing wall 18b. This configuration forms an area of rectangular cross section in which the rotor engaging member 36 and inner engagement member 32 of the unitizing element 30 are housed.

In a preferred embodiment of the present invention, at least one of the walls of the stator groove 54 and corresponding wall of the rotor groove 14 are offset, such that one of the pairs of rotor groove wall 58a or 58b and corresponding stator groove wall 18a or 18b are not in axial alignment.

Figure 5:
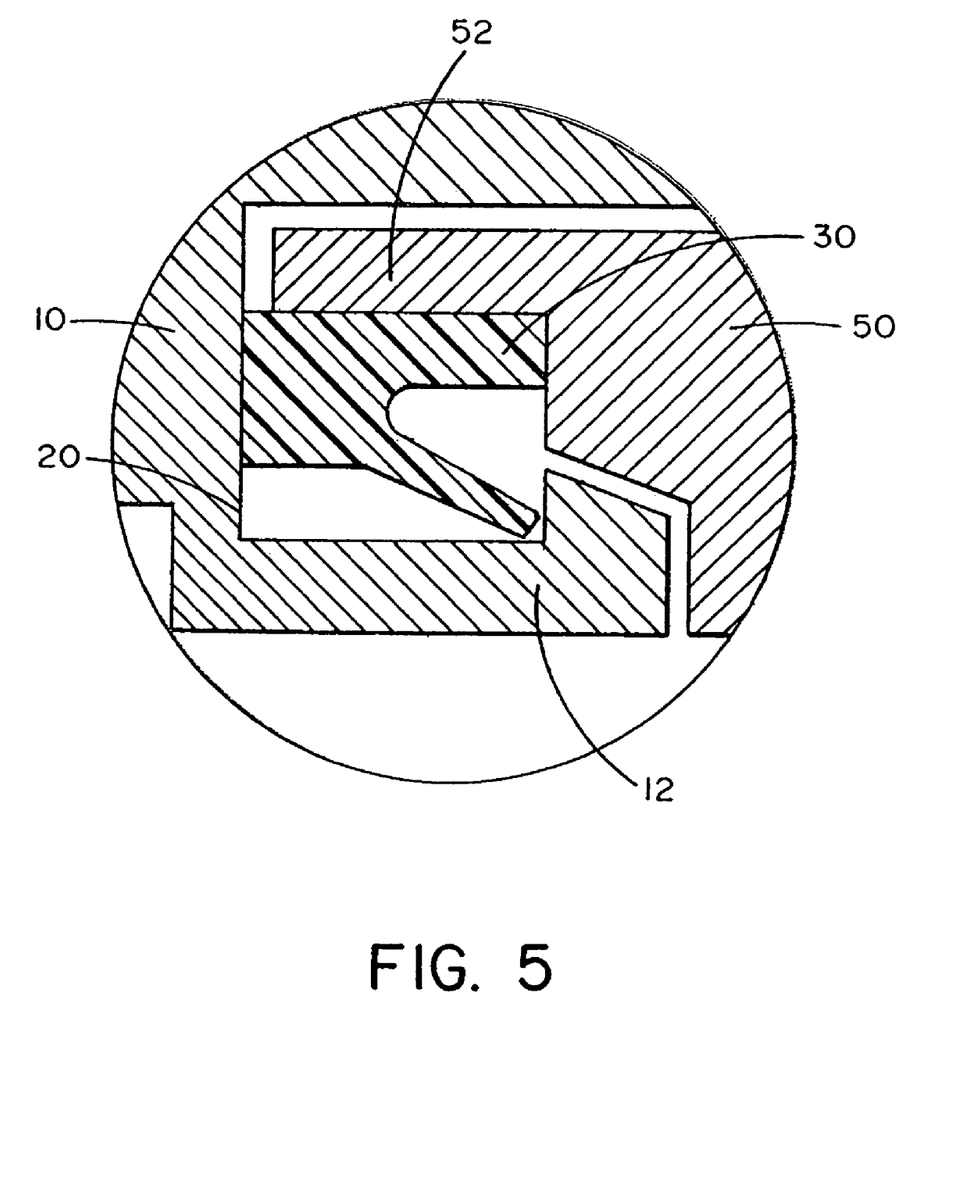
FIG. 5 is a cross sectional view of an embodiment of the present invention comprising a cross section of the sealing assembly including a rotor, stator, and unitizing element.

One example of this offset is shown in FIG. 5 wherein one wall of the stator groove 18b comprises the rear wall of the stator 20. FIG. 5 also illustrates another embodiment of the present invention in which one wall of the rotor groove is eliminated such there is no rotor groove wall 58b as is shown in FIG. 3. In this embodiment, the unitizing element is press fit into the rotor. The unitizing element of the press fit embodiment comprises a constant outer diameter throughout the length of the unitizing element.

Figure 7:
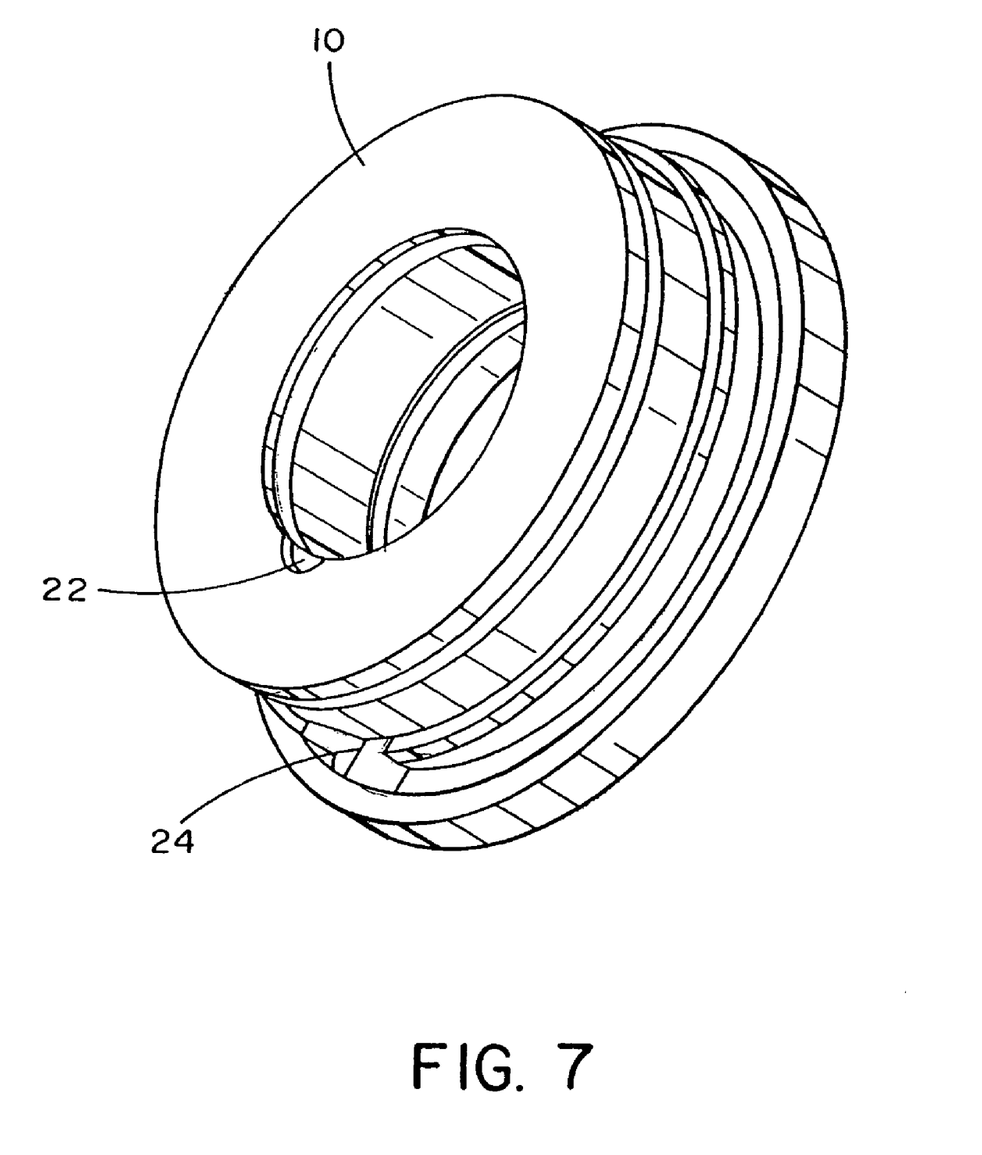
FIG. 7 is a isometric view of the sealing assembly in an embodiment of the sealing assembly of the present invention showing a lubricant drainage port and a contaminant expulsion port.

Referring to FIG. 7, in another embodiment of the present invention, the stator 10 further comprises an oil drainage port 22 on the interior shaft side of the seal to facilitate drainage of oil that has migrated into the unitizing element area. Over time, lubricant may seep past the stator and unitizing element. The oil drainage port 22 provides a pathway for oil to pass back into the bearing cavity side of the seal to lubricate the rotating shaft.

In a further embodiment of the present invention, the stator 10 further comprises an expulsion port 24 located on the stator's atmospheric side. The expulsion port 24 allows any contaminants that migrate into the seal area to be expelled from the assembly.

In a preferred embodiment of the present invention, the sealing assembly comprises the rotor 50 and stator 10 with the unitizing element 30 housed therein. The rotor engaging member 36 of the unitizing element 30 engages the rotor groove 54 such that the axially outer sides of the rotor engaging member 36 contact the opposing walls of the rotor groove 54. In a most preferred embodiment of the present invention, the rotor engaging member 36 "floats" within the rotor groove 54 so as to minimize contact and friction during operation. When there is an axial shift of the rotor and stator relative to each other, the rotor engaging member 36 will then contact the corresponding wall of the rotor groove 54.

Similarly, the stator engaging member 32 contacts the stator groove and/or the groove wall 18a. During operation, the unitizing element "floats" within the cavity formed between the rotor and stator. However, the stator engaging member 32, being flexibly attached to the unitizing element 30, does provide a means to keep the unitizing element 30 in position by contacting the wall 18a of the stator groove 14 should the assembly shift during operation.

In a further embodiment of the present invention, the unitizing element 30 also contains a rear member 34. The rear member 34 prevents the rotor and stator from directly contacting one another in the event of axial movement toward each other. If the rotor shifts toward the stator, the rear member 34 of the unitizing element 30 will contact the rear wall of the stator 20 before the rotor and stator make direct contact. The rotor 50 will contact and press against the unitizing element 30 via one of the opposing walls 58a of the rotor groove 54. This action will force the rear member 34 of the unitizing element against the stator rear wall 20. Since the unitizing element is preferably constructed of a lubricious plastic material, the frictional force between the unitizing element 30 and the rotor 50, and the unitizing element 30 and the stator 10 will be significantly less than direct contact between the rotor 50 and stator 10. The unitizing element 30 thereby provides a wear-resistant buffer between the rotor and stator components. This serves to prolong the useful life of the rotor and stator by minimizing wear of these two parts. When the unitizing element 30 reaches the end of its useful life, it may be easily replaced, with less operational downtime and replacement cost than that associated with replacing the rotor and stator.

Figure 6:
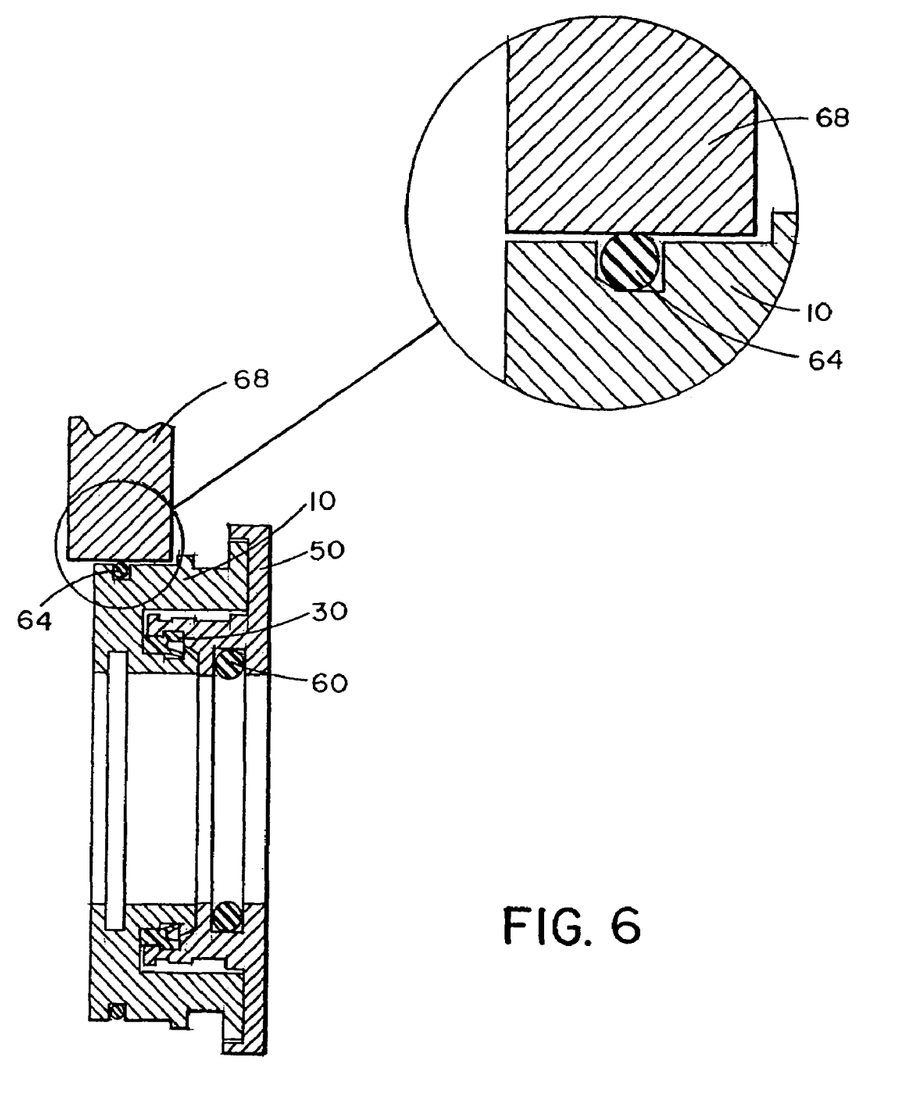
FIG. 6 is a cross sectional view of the sealing assembly of an embodiment of the present invention with an enlarged view of the stator O-ring.

As shown in FIG. 6, in another embodiment of the present invention, the stator 10 is sealingly engaged to the bearing housing 68 with an O-ring 64. The O-ring resides within a groove formed in the radially outer side of the stator. The groove is uniquely formed such that the bottom surface of the groove is sloped such that one side of the groove is deeper than the opposing side of the groove. In the configuration shown in FIG. 6, the side most proximate the body of the bearing housing is less deep than the side remote from the body of the bearing housing. The effect of this is to cause the O-ring to compress and increase pressure in the bearing housing should the stator begin to move away from the body of the bearing housing. This increased pressure will halt the movement of the stator.

Figure 8:
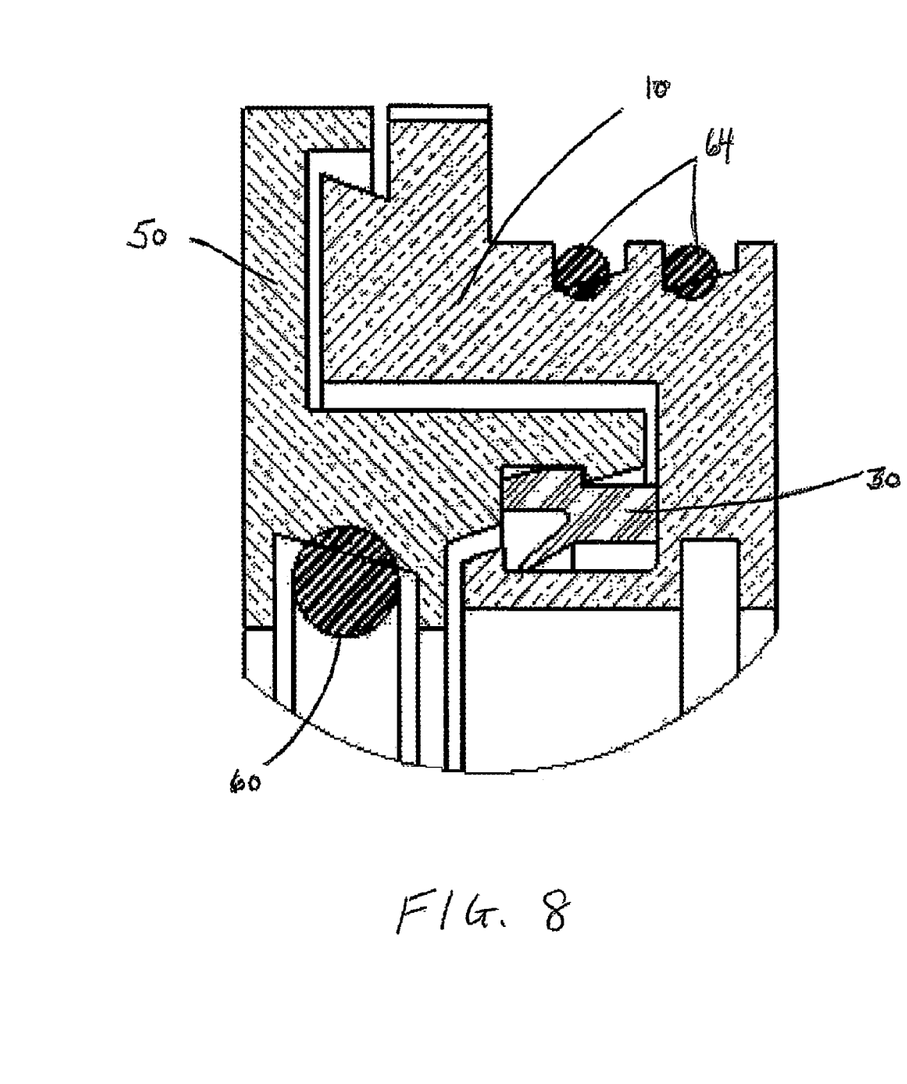
FIG. 8 is a cross-sectional view of the sealing assembly of an embodiment of the present invention.

The specific angle and position shown in FIG. 6 are exemplary only. In various embodiments, the sloping surface may comprise a portion of the groove bottom, or the entirety of the groove bottom. It is to be understood that this principle and sloped O-ring groove can be used to secure the stator 50 to the rotating shaft through a similar groove on the radially inner surface of the rotor as shown in FIG. 8. Additionally, a plurality of possible groove shapes can be used to increase compression of the O-ring when undesirable axial movement occurs.

In another aspect of the present invention, a method for assembling a sealing assembly is provided. During assembly, the unitizing element 30 of an embodiment of the present invention is inserted between the stator 10 and the rotor 50 to form a sealing assembly. The preferred method for assembling the sealing assembly comprises first engaging the unitizing element 30 and the rotor 50, then engaging the unitizing element and rotor with the stator 10 and bearing housing.

The method further comprises, providing a unitizing element 30 comprising: a rotor engaging member 36, a stator engaging member 32, and a rear member 34, and providing a rotor comprising a rotor annular flange 52 extending in an axial direction and having a groove 54 therein; and positioning the unitizing element 30 within the rotor 50 such that the rotor engaging member 36 of the unitizing element engages the groove 54 in the annular flange of the rotor. Contact between the rotor engaging member 36 and the opposing walls of the rotor groove 58a, 58b securely retains the unitizing element in position.

The assembled rotor 50 and unitizing element 30 are engaged to the stator 10. The stator 10 comprises an annular flange 12 extending toward the rotor 50 and having a groove 14 on a radially outer side thereof. As the unitizing element 30 slides around the annular flange 12, the stator engaging member 32 is deflected and deforms into the void 40 to allow the unitizing element to slide into position around the stator annular flange. Once the stator engaging member 32 has been pushed past the stator lip 16, the stator engaging member 32 is free to flex back into an extended position within the stator groove 14. The stator engaging member 32, in the extended position, will extend in the groove 14 past the outer circumference of the stator lip 16. In this position, the stator engaging member 32 will serve to provide a means for retaining the unitizing element 30 and rotor 50 with the stator 10 by preventing axial movement of the rotor away from the stator.

In this position, the unitizing element 30 unitizes the rotor 50 and the stator 10 by filling the void therebetween and contacting the opposing walls of the rotor groove 58a, 58b. The engaging member 32 rests within the grove 14 on the stator 10, but does not contact opposing walls 18a, 18b during normal operation. If and when axial force is applied moving the rotor 50 away from the stator 10, opposing wall 58b will contact the rotor engaging member 36 in the area of the wall 38. This will force the unitizing element 30 to move with the rotor 50. Movement of the unitizing element 30 will be arrested by contact of the stator engaging member 32 with opposing wall 18a of the stator groove 14. By this action, the sealing assembly comprising the rotor, unitizing element, and stator, is unitized. The only means for disassembling the sealing assembly is to apply enough axial force to irreparably damage the unitizing element.

In addition to the unitizing effect in the sealing assembly, the unitizing element also creates a non-contacting relationship between the rotor and stator. In the event of axial movement of the rotor 50 toward the stator 10, the rotor will contact the unitizing element 30 and force the rear member 34 into contact with the stator rear wall 20. The unitizing element 30 is designed such that the rear member 34 extends toward the stator farther than the rotor annular flange 52. Thus, the rotor annular flange is prevented from contacting the rear wall of the stator, thereby increasing the useful life of the rotor and stator by preventing undue wear of the components.

Although the present invention has been described with reference to particular embodiments, it should be recognized that these embodiments are merely illustrative of the principles of the present invention. Those of ordinary skill in the art will appreciate that the unitizing element and assembly of the present invention may be constructed and implemented with other materials and in other ways and embodiments. Accordingly, the description herein should not be read as limiting the present invention, as other embodiments also fall within the scope of the present invention.

What is claimed is:

1. A sealing assembly for sealing a rotating shaft and a bearing housing comprising:
    a rotor comprising:
        an annular engagement flange extending in an axial direction comprising a groove on a radial side thereof
    a stator comprising:
        an annular engagement flange extending in an axial direction comprising a groove on a radial side thereof; and
        an O-ring to sealing engage the stator to the bearing housing, said O-ring residing within a recess formed in the radially outer circumference of the stator, said recess comprising a inner surface wherein one end of the inner surface is less deep than the opposing end of the inner surface to provide a locking mechanism to prevent movement of the stator in a direction away from the bearing housing; and
    an annular unitizing element comprising:
        a stator engaging member;
        a rotor engaging member;
        a rear member;
        two adjoining areas of differing diameter, one area corresponding to the rotor engagement member and the other corresponding to the rear member;
        wherein the rotor engaging member engages the rotor groove; and
        wherein the stator engaging member extends from the unitizing element in a radial direction to engage the stator groove.

2. The sealing assembly according to claim 1, wherein the inner surface comprises:
   a first surface portion extending in an axial direction; and
   a second surface portion extending from the first surface portion in a radially inward direction.

3. The sealing assembly according to claim 1, wherein the inner surface comprises:
   a first surface portion extending in an axial direction; and
   a second surface portion extending from the first surface portion in a radially outward direction.

4. A sealing assembly for sealing a rotating shaft and a bearing housing comprising:
   a rotor comprising:
      an annular engagement flange extending in an axial direction comprising a groove on a radial side thereof; and
      a first O-ring to sealingly engage the rotor to a shaft, said O-ring residing within a recess formed in the radially inner circumference of the rotor, said recess comprising a inner surface wherein one end of the inner surface is less deep than the opposing end of the inner surface to provide a locking mechanism to prevent movement of the rotor in a direction away from the bearing housing;
   a stator comprising:
      an annular engagement flange extending in an axial direction comprising a groove on a radial side thereof; and
   an annular unitizing element comprising:
      a stator engaging member;
      a rotor engaging member;
      a rear member;
      two adjoining areas of differing diameter, one area corresponding to the rotor engagement member and the other corresponding to the rear member;
      wherein the rotor engaging member engages the rotor groove; and
      wherein the stator engaging member extends from the unitizing element in a radial direction to engage the stator groove.

5. The sealing assembly according to claim 4, wherein the inner surface comprises:
   a first surface portion extending in an axial direction; and
   a second surface portion extending from the first surface portion in a radially inward direction.

6. The sealing assembly according to claim 4, wherein the inner surface comprises:
   a first surface portion extending in an axial direction; and
   a second surface portion extending from the first surface portion in a radially outward direction.

7. A sealing assembly comprising:
   a stator comprising:
      an annular engagement flange extending in an axial direction comprising a groove on a radial side thereof;
   a rotor comprising:
      an annular engagement flange extending in an axial direction comprising a groove on a radial side thereof; and
      an O-ring to sealing engage the rotor to a shaft, said O-ring residing within a recess formed in the radially inner circumference of the rotor, said recess comprising a rotor recess inner surface wherein one end of the rotor recess inner surface is less deep than the opposing end of the rotor recess inner surface to provide a locking mechanism to prevent movement of the rotor in a direction away from the bearing housing;
      a second O-ring to sealing engage the stator to a bearing housing; said second O-ring residing within a recess formed in the radially outer circumference of the stator, said recess comprising a stator recess inner surface wherein one end of the stator recess inner surface is less deep than the opposing end of the stator recess inner surface to provide a locking mechanism to prevent movement of the stator in a direction away from the bearing housing; and
   an annular unitizing element comprising:
      a stator engaging member;
      a rotor engaging member;
      a rear member;
      two adjoining areas of differing diameter, one area corresponding to the rotor engagement member and the other corresponding to the rear member;
      wherein the rotor engaging member engages the rotor groove; and
      wherein the stator engaging member extends from the unitizing element in a radial direction to engage the stator groove.

8. The sealing assembly according to claim 7 wherein the rotor recess inner surface comprises:
   a first rotor recess surface portion extending in an axial direction; and
   a second rotor recess surface portion extending from the first rotor recess surface portion in a radially inward direction.

9. The sealing assembly according to claim 7, wherein the rotor recess inner surface comprises:
   a first rotor recess surface portion extending in an axial direction; and
   a second rotor recess surface portion extending from the first rotor recess surface portion in a radially outward direction.

10. The sealing assembly according to claim 7 wherein the stator recess inner surface comprises:
   a first stator recess surface portion extending in an axial direction; and
   a second stator recess surface portion extending from the first stator recess surface portion in a radially inward direction.

11. The sealing assembly according to claim 7 wherein the stator recess inner surface comprises:
   a first stator recess surface portion extending in an axial direction; and
   a second stator recess surface portion extending from the first stator recess surface portion in a radially outward direction.

* * * * *